United States Patent
Bush et al.

(10) Patent No.: US 10,859,673 B2
(45) Date of Patent: Dec. 8, 2020

(54) METHOD FOR DISAMBIGUATING AMBIGUOUS DETECTIONS IN SENSOR FUSION SYSTEMS

(71) Applicant: GM GLOBAL TECHNOLOGY OPERATIONS LLC, Detroit, MI (US)

(72) Inventors: Lawrence A. Bush, Shelby Township, MI (US); Brent N. Bacchus, Warren, MI (US); Shuqing Zeng, Sterling Heights, MI (US); Stephen W. Decker, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 16/177,799

(22) Filed: Nov. 1, 2018

(65) Prior Publication Data
US 2020/0142026 A1    May 7, 2020

(51) Int. Cl.
| | | |
|---|---|---|
| *G01S 7/40* | (2006.01) | |
| *G01S 13/89* | (2006.01) | |
| *G01S 13/86* | (2006.01) | |
| *G01S 13/66* | (2006.01) | |
| *G01S 13/08* | (2006.01) | |
| *G01S 13/87* | (2006.01) | |
| *G01S 13/58* | (2006.01) | |
| *G05D 1/02* | (2020.01) | |
| *G05D 1/00* | (2006.01) | |

(52) U.S. Cl.
CPC .............. *G01S 7/40* (2013.01); *G01S 13/08* (2013.01); *G01S 13/58* (2013.01); *G01S 13/66* (2013.01); *G01S 13/867* (2013.01); *G01S 13/87* (2013.01); *G01S 13/89* (2013.01); *G05D 1/0088* (2013.01); *G05D 1/0246* (2013.01); *G05D 1/0257* (2013.01)

(58) Field of Classification Search
CPC . G01S 7/40; G01S 13/08; G01S 13/58; G01S 13/66; G01S 13/867; G01S 13/87; G01S 13/89; G05D 1/0088; G05D 1/0246; G05D 1/0257
USPC ......................................................... 701/300
See application file for complete search history.

(56) References Cited

U.S. PATENT DOCUMENTS 6,727,844 B1 *    4/2004    Zimmermann .......... G01C 3/08
                                                                342/70
2019/0346561 A1 *  11/2019    Hofmann ................ G01S 7/415

* cited by examiner

*Primary Examiner* — Gertrude Arthur Jeanglaude
(74) *Attorney, Agent, or Firm* — Lorenz & Kopf, LLP

(57) ABSTRACT

A disambiguating system for disambiguating between ambiguous detections is provided. The system includes a plurality of modules, wherein each module is configured to disambiguate between ambiguous detections by selecting, as a true detection, one candidate detection in a set of ambiguous detections and wherein each module is configured to apply a different selection technique. The system includes: one or more modules configured to select as the true detection, the candidate detection whose associated position is closer to a position indicated by other data and one or more modules configured to select as the true detection, the candidate detection with the highest probability of being true based on other sensor data.

20 Claims, 11 Drawing Sheets

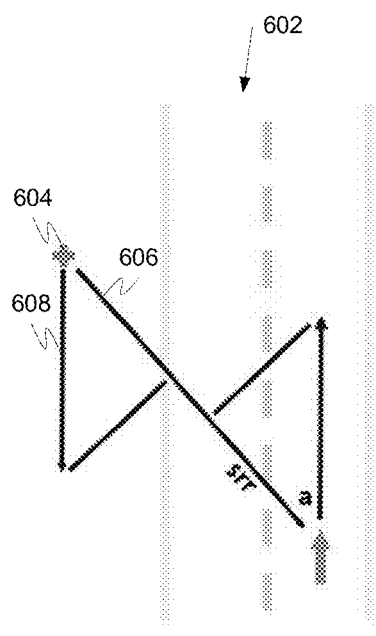 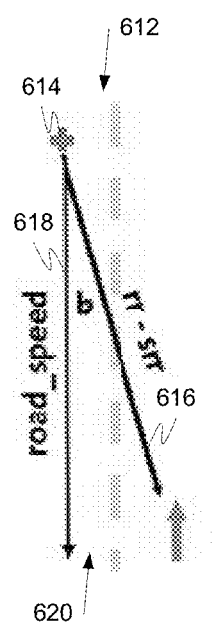
FIG. 6A　　FIG. 6B

METHOD FOR DISAMBIGUATING AMBIGUOUS DETECTIONS IN SENSOR FUSION SYSTEMS

TECHNICAL FIELD

The present disclosure generally relates to object detection and tracking, and more particularly relates to systems and methods in a vehicle for disambiguating ambiguous detections such as ambiguous radar detections.

Vehicle perception systems have been introduced into vehicles to allow a vehicle to sense its environment and in some cases to allow the vehicle to navigate autonomously or semi-autonomously. Sensing devices that may be employed in vehicle perception systems include radar, lidar, image sensors, and others.

While recent years have seen significant advancements in vehicle perception systems, such systems might still be improved in a number of respects. Radars, particularly those used in automotive applications, may return more than one ambiguous position detection for a single target, such as two candidate azimuth or elevation angles. Radar hardware alone may be unable to resolve this ambiguity.

Accordingly, it is desirable to provide improved systems and methods for disambiguating the ambiguous detections. Furthermore, other desirable features and characteristics of the present invention will become apparent from the subsequent detailed description and the appended claims, taken in conjunction with the accompanying drawings and the foregoing technical field and background.

SUMMARY

Systems and methods for an enhanced radar detection system are provided. In one embodiment, a disambiguating system for disambiguating between ambiguous detections is provided. The system includes a plurality of modules, wherein each module is configured to disambiguate between ambiguous detections by selecting, as a true detection, one candidate detection in a set of ambiguous detections and wherein each module is configured to apply a different selection technique. The system includes: one or more modules configured, by a processor, to select as the true detection, the candidate detection whose associated position is closer to a position indicated by other data and one or more modules configured, by a processor, to select as the true detection, the candidate detection with the highest probability of being true based on other sensor data.

In one embodiment, the ambiguous detections include ambiguous radar detections, the set of ambiguous detections includes two ambiguous radar detections, and selecting as a true detection one candidate detection in a set of ambiguous detections includes selecting as a true detection one candidate radar detection in a set of two ambiguous radar detections.

In one embodiment, the one or more modules configured to select as the true detection the candidate detection whose associated position is closer to a position indicated by other data includes one or more of: a first module configured to select, as a true detection, the candidate detection that is closest to a predicted next position for a target; a second module configured to select, as a true detection, the candidate detection that is closest to a first known travel pathway; a third module configured to select, as a true detection, the candidate detection that indicates a position and velocity that are consistent with a target traveling on a second known travel pathway; and a fourth module configured to select, as a true detection, the candidate detection that indicates a position that is closest to a position indicated by a detection from another sensor.

In one embodiment, the first module is configured to compute a distance metric from the last position of a tracked target to each candidate detection, predict a next position for the tracked target, and select a candidate detection whose distance from the predicted next position is less than a threshold distance.

In one embodiment, the first known travel pathway is determined from map data and wherein the second module is configured to select the candidate detection that is closest to the first known travel pathway and within a threshold distance from the first known travel pathway.

In one embodiment, the first known travel pathway is determined by imaging data and wherein the second module is configured to select the candidate detection that is closest to first known travel pathway and within a threshold distance from the travel pathway.

In one embodiment, the third module is configured to calculate an apparent static range rate of a target based on a candidate detection, calculate road velocity, and filter out candidate detections that indicate a target with a position and calculated velocity that is inconsistent with traveling on the second known travel pathway.

In one embodiment, the fourth module is configured to compare the candidate detection with data from a second sensor that has an overlapped field of view.

In one embodiment, the second sensor includes an imaging device.

In one embodiment, the second sensor includes a radar sensor.

In one embodiment, the one or more modules configured to select as the true detection the candidate detection with the highest probability of being true based on other sensor data includes one or more of: a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real; and a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real.

In one embodiment, the system further includes a seventh module including a model trained using machine learning techniques to select the candidate detection that indicates a position that is consistent with a learned drivable path.

In one embodiment, the model was trained using reinforcement learning techniques using a data set of past ambiguous radar data and time-limited snippets of drivable paths and wherein the seventh module is configured to select the candidate detection that likely contributed to one of the drivable paths.

In another embodiment, a vehicle, including a radar detection sensing device, a second sensing device, and a disambiguating system for disambiguating between ambiguous radar detections is provided. The disambiguating system includes a plurality of modules, wherein each module is configured to disambiguate between ambiguous radar detections by selecting, as a true detection, one candidate radar detection in a set of ambiguous radar detections, and wherein each module is configured to apply a different selection technique. The disambiguating system includes: one or more modules configured to select as the true detection, the candidate radar detection whose associated position is closer to a position indicated by data from the second sensing device; and one or more modules configured to select as the true detection, the candidate detection with the highest probability of being true based on other sensor data.

In one embodiment, the one or more modules configured to select as the true detection the candidate detection whose associated position is closer to a position indicated by other data include one or more of: a first module configured to select, as a true detection, the candidate detection that is closest to a predicted next position for a target; a second module configured to select, as a true detection, the candidate detection that is closest to a first known travel pathway; a third module configured to select, as a true detection, the candidate detection that indicates a position and velocity that are consistent with a target traveling on a second known travel pathway; and a fourth module configured to select, as a true detection, the candidate detection that indicates a position that is closest to a position indicated by a detection from another sensor.

In one embodiment, the first module is configured to compute a distance metric from the last position of a tracked target to each candidate detection, predict a next position for the tracked target, and select a candidate detection whose distance from the predicted next position is less than a threshold distance; the first known travel pathway is determined from map data or imaging data and wherein the second module is configured to select the candidate detection that is closest to the first known travel pathway and within a threshold distance from the first known travel pathway; the third module is configured to calculate an apparent static range rate of a target based on a candidate detection, calculate road velocity, and filter out candidate detections that indicate a target with a position and calculated velocity that is inconsistent with traveling on the second known travel pathway; the fourth module is configured to compare the candidate detection with data from a second sensor that has an overlapped field of view; and the second sensor includes an imaging device or a radar sensor.

In one embodiment, the one or more modules configured to select as the true detection the candidate detection with the highest probability of being true based on other sensor data includes one or more of: a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real; and a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real.

In one embodiment, the vehicle further includes a seventh module including a model trained using machine learning techniques to select the candidate detection that indicates a position that is consistent with a learned drivable path.

In one embodiment, the model was trained using reinforcement learning techniques using a data set of past ambiguous radar data and time-limited snippets of drivable paths and wherein the seventh module is configured to select the candidate detection that likely contributed to one of the drivable paths.

In another embodiment, a disambiguating system for disambiguating between ambiguous detections is provided. The system includes: a first module configured to select, as a true detection, the candidate detection that is closest to a predicted next position for a target, wherein the first module is configured to compute a distance metric from the last position of a tracked target to each candidate detection, predict a next position for the tracked target, and select a candidate detection whose distance from the predicted next position is less than a threshold distance; a second module configured to select, as a true detection, the candidate detection that is closest to a first known travel pathway, wherein the first known travel pathway is determined from map data or imaging data and the second module is configured to select the candidate detection that is closest to the first known travel pathway and within a threshold distance from the first known travel pathway; a third module configured to select, as a true detection, the candidate detection that indicates a position and velocity that are consistent with a target traveling on a second known travel pathway, wherein the third module is configured to calculate an apparent static range rate of a target based on a candidate detection, calculate road velocity, and filter out candidate detections that indicate a target with a position and calculated velocity that is inconsistent with traveling on the second known travel pathway; a fourth module configured to select, as a true detection, the candidate detection that indicates a position that is closest to a position indicated by a detection from another sensor, wherein the fourth module is configured to compare the candidate detection with data from a second sensor that has an overlapped field of view and the second sensor includes an imaging device or a radar sensor; a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real; a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real; and a seventh module including a model trained using machine learning techniques to select the candidate detection that indicates a position that is consistent with a learned drivable path, wherein the model was trained using reinforcement learning techniques using a data set of past ambiguous radar data and time-limited snippets of drivable paths and wherein the seventh module is configured to select the candidate detection that likely contributed to one of the drivable paths.

DESCRIPTION OF THE DRAWINGS

The exemplary embodiments will hereinafter be described in conjunction with the following drawing figures, wherein like numerals denote like elements, and wherein:

FIGS. 6A and 6B are diagrams depicting an example illustration of the use of an example Bayesian map based road speed dynamics modelling module to select the more likely true detection between multiple ambiguous radar candidate detections, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The apparatus, systems, methods, disclosed herein may utilize results from other sensors that are present in a vehicle (e.g. cameras, other radars) to resolve the ambiguity between ambiguous detection results. The apparatus, systems, methods, disclosed herein can reduce radar detection false alarms by reducing clutter. The apparatus, systems, methods, disclosed herein may combine multiple approaches to resolve the ambiguity between ambiguous detection results.

Figure 1:
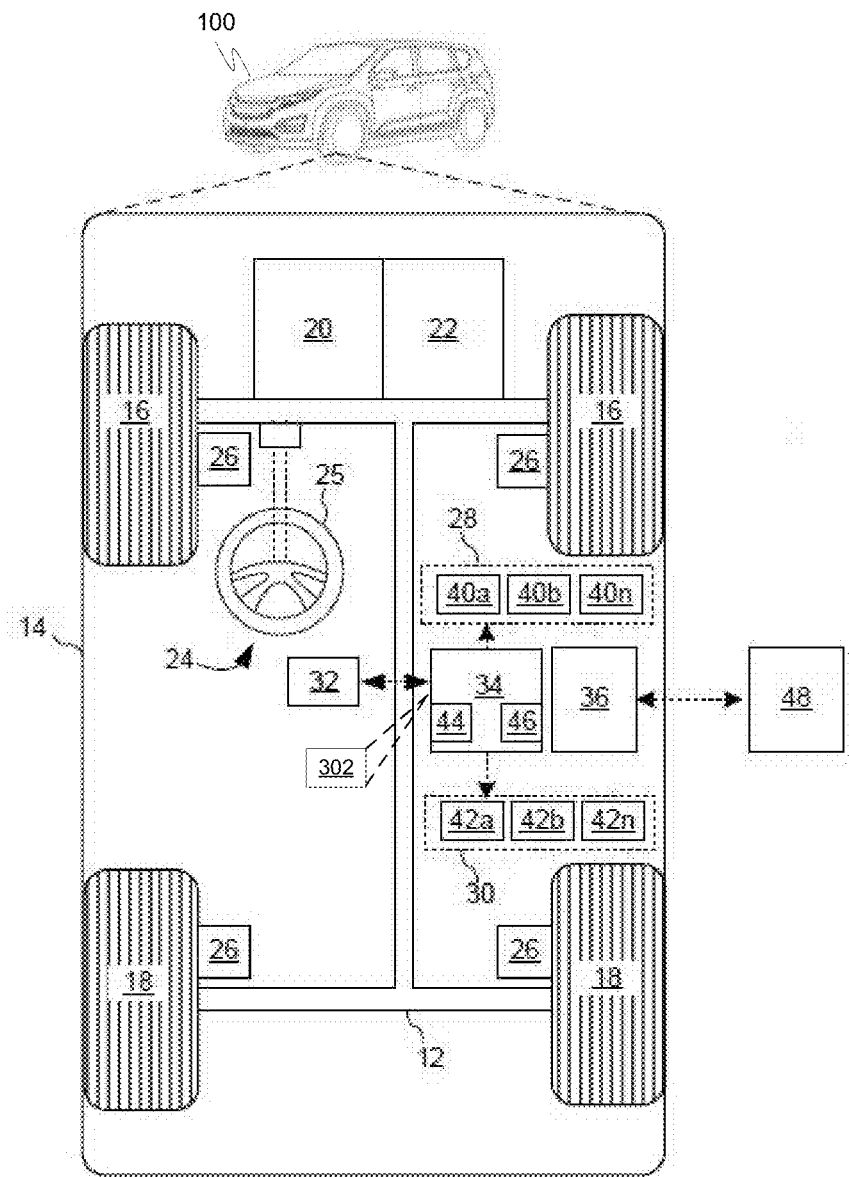
FIG. 1 depicts an example vehicle that includes a radar detections disambiguating module for use with a radar system, in accordance with various embodiments.

FIG. 1 depicts an example vehicle 100 that includes a radar detection disambiguating module 302 for use with a radar system. As depicted in FIG. 1, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 may be an autonomous vehicle or a semi-autonomous vehicle. An autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 100 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 100 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 100. In various embodiments, the data storage device 32 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 34 is configured to implement a mapping system as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
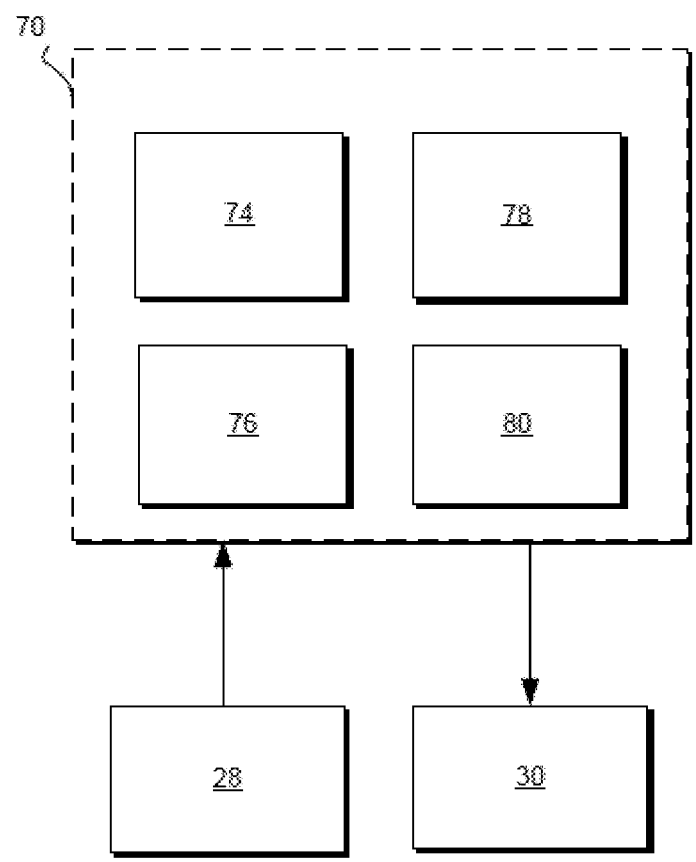
FIG. 2 is a functional block diagram illustrating an autonomous driving system (ADS) associated with an autonomous vehicle, in accordance with various embodiments.

In accordance with various embodiments, controller 34 may implement an autonomous driving system (ADS) 70 as shown in FIG. 2. That is, suitable software and/or hardware components of controller 34 (e.g., processor 44 and computer-readable storage device 46) may be utilized to provide an autonomous driving system 70 that is used in conjunction with vehicle 100.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors. In various embodiments, all or parts of the radar detections disambiguating module 302 may be included within the perception system 74.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
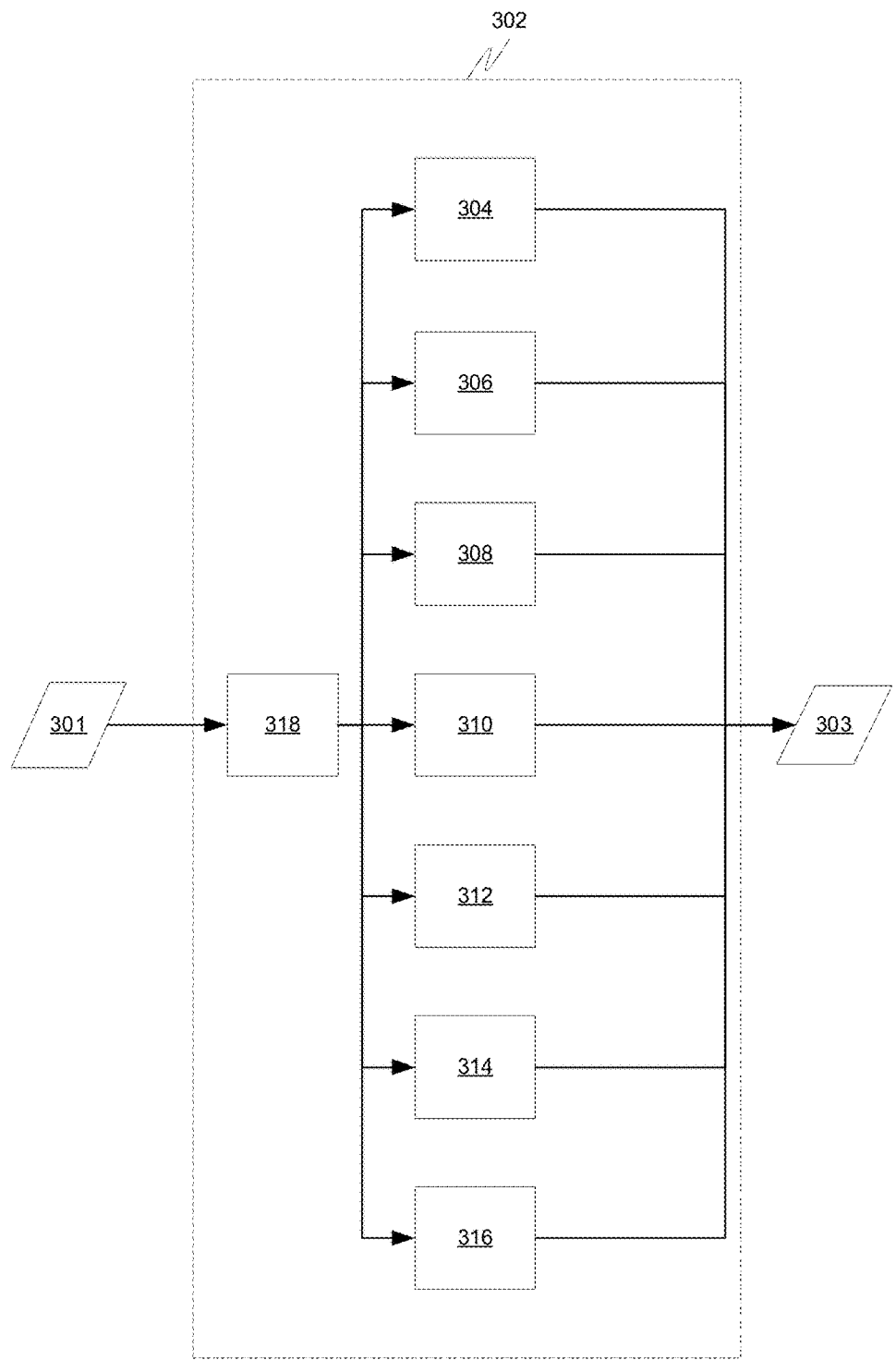
FIG. 3 is a block diagram depicting an example radar detections disambiguating module for use in a vehicle, in accordance with various embodiments.

FIG. 3 is a block diagram depicting an example radar detections disambiguating module 302 for use in a vehicle. The example radar detections disambiguating module 302 is configured to apply one or more disambiguating modules to determine which of a plurality of ambiguous radar detections 301 is a likely true detection 303. The plurality of disambiguating modules in the example radar detections disambiguating module 302 includes a track gating module 304, a map matching module 306, a Bayesian Map Based Road Speed Dynamics modelling module 308, a cross-sensor association module 310, a first bi-modal measurement module 312, a second bi-modal measurement module 314, and a reinforcement learning discriminator module 316. The example radar detections disambiguating module 302 further includes a selection module 318 configured to select the one or more disambiguating modules to apply to determine which of a plurality of ambiguous radar detections 301 is a likely true detection 303. The example radar detections disambiguating module 302 is further configured to output the likely detection determined by a disambiguating module. The radar detections disambiguating module 302 may be implemented on the controller 34 of FIG. 1, on a separate controller, or on a combination of controllers, in various embodiments.

The example track gating module 304 is configured to select the more likely true detection 303 between multiple ambiguous radar candidate detections 301 by choosing a candidate that is closest to a predicted target position for a radar detection. The selection module 318 may choose the track gating module 304 if radar tracks already exist for a target and/or alternate disambiguation methods are not available. The example track gating module 304 is configured to (a) compute, for each existing radar track, a distance metric to each ambiguous candidate detection; (b) predict a next position of a target position using a prediction filter (e.g., a Kalman filter); and (c) select the ambiguous radar candidate detections 301 that is closest to the predicted next position and less than a threshold distance away from the predicted next position. The distance metric can include, but is not limited to, the Euclidian distance or the Mahalanobis distance; the latter of which can be calculated with knowledge of the predicted position covariance obtained from a Kalman filter.

In one example, the track gating module 304 may choose a candidate that is closest to a predicted target position for a radar detection by computing, for each existing radar track, a distance metric from the last position of a tracked target to each ambiguous candidate detection; applying a Kalman filter to predict the next position of the tracked target and converting the predicted next position to the measurement plane (e.g., for linear KF, $y^-=H F\hat{x}$); computing squared Mahalanobis distance $d_k^2=(y^-)^T S^{-1} y^-$ where $S=R+HP^- H^T$ for candidate detection $k \in \{1, 2, \ldots\}$ (can alternatively use Euclidian distance); and, for each existing radar track, gating the candidate detection, using the knowledge that $d_k^2$ is chi-squared distributed to pick a threshold T for a percentile P (e.g., 95%), and associating detection k with the track if $d_k^2 < T$. In the event that multiple ambiguous detections fall within the gate, the detection with the shortest Mahalanobis distance is chosen.

Figure 4:
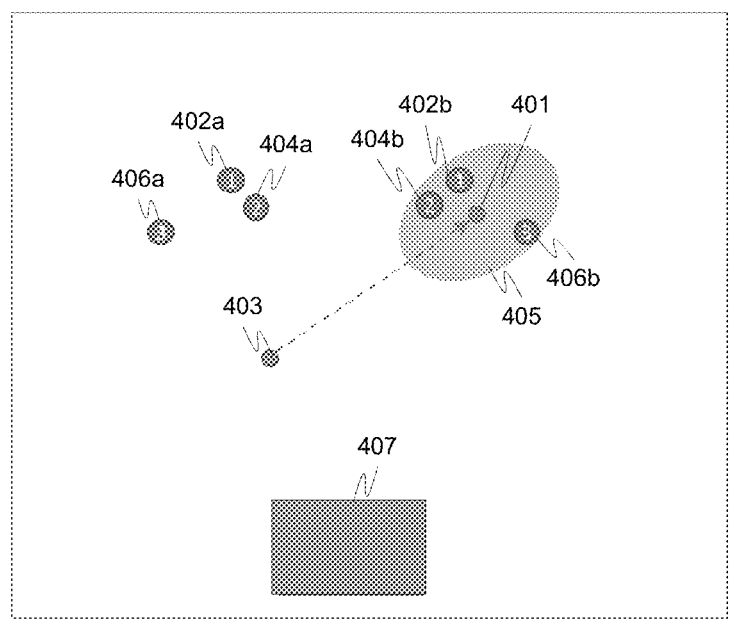
FIG. 4 is a diagram depicting an example illustration of the use of an example track gating module to select the more likely true detection between multiple ambiguous radar candidate detections received from radar sensors, in accordance with various embodiments.

FIG. 4 provides an example illustration of the use of an example track gating module 304 to select the more likely true detection 303 between multiple ambiguous radar candidate detections 301 received from radar sensors 407. Depicted are three sets of ambiguous candidate detections, candidate detection set 1 which includes candidate detections 402a and 402b, candidate detection set 2 which includes candidate detections 404a and 404b, and candidate detection set 3 which includes candidate detections 406a and 406b. The example track gating module 304 is configured to access a prediction filter (e.g., a Kalman filter) to obtain a predicted location 401 for a target based on the last position 403 for the target. Using the predicted location 401, the example track gating module 304 is configured to identify a region 405 (e.g., apply a gate) that is within a threshold distance away from the next predicted location 401. The example track gating module 304 is configured to select the likely true detection by selecting the nearest ambiguous candidate detection (e.g., candidate detection 402b) that is within the gate region 405 as the likely true detection with candidate detection set 1. The example track gating module 304 is configured to select the likely true detection for candidate detection set 2 and candidate detection set 3 in the same manner.

Referring back to FIG. 3, the example map matching module 306 is configured to select the more likely true detection 303 between multiple ambiguous radar candidate detections 301 by selecting a candidate detection that is closest to a known target path and less than some maximum distance threshold distance T away from the target path. The selection module 318 may choose the map matching module 306 to select the more likely true detection 303 if a map of the area in the vicinity of the vehicle is available and/or alternate disambiguation methods are not available.

The example map matching module 306 is configured to use the position of a road on an area map to gain knowledge of valid target positions, if an area map is available. The example map matching module 306 is also configured to infer a valid target position from camera data or path plan data (e.g., from lane, curb detection, target trails). The example map matching module 306 is configured to select the candidate detection that is closest to a known target path (e.g., road) and less than a maximum threshold distance T away from the target path. The map could be a detailed previously existing map or a coarse map region derived from detection results from an imaging device such as a camera.

Figure 5A:
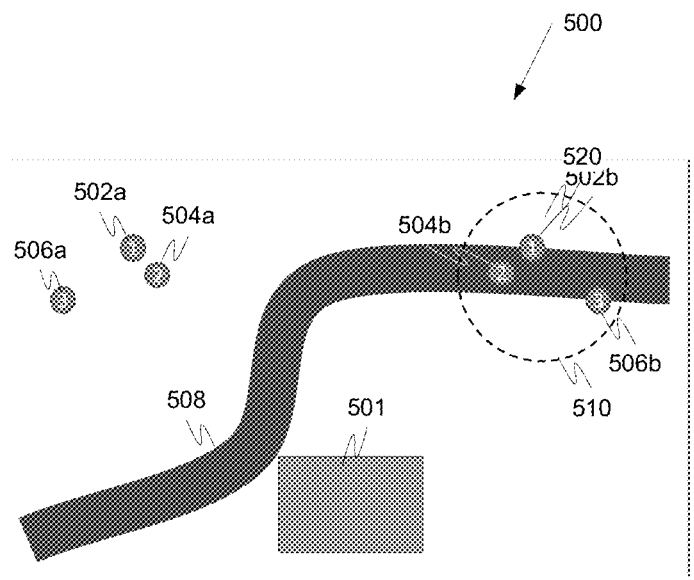
FIG. 5A is a diagram depicting an example illustration of the use of an example map matching module with a detailed previously existing map to select the more likely true detection between multiple ambiguous radar candidate detections received from radar sensors, in accordance with various embodiments.

FIG. 5A provides an example illustration of the use of an example map matching module 306 with a detailed previously existing map 500 to select the more likely true detection 303 between multiple ambiguous radar candidate detections 301 received from radar sensors 501. Depicted are three sets of ambiguous candidate detections, candidate detection set 1 which includes candidate detections 502a and 502b, candidate detection set 2 which includes candidate detections 504a and 504b, and candidate detection set 3 which includes candidate detections 506a and 506b. The example map matching module 306 is configured to map the location of the ambiguous candidate detections on the map 500, and access mapping data to obtain the location of a road 508. The example map matching module 306 is configured to determine the candidate detection in each set of candidate detections that is closest to the road 508. If the candidate detection that is closest to the road (e.g., 502b, 504b, 506b) is also within a threshold distance from the road, the example map matching module 306 is configured to identify that candidate detection (e.g., 502b, 504b, 506b) as a likely true detection 303. By determining the likely true detection 303, the vehicle can identify a true target location 510.

Figure 5B:
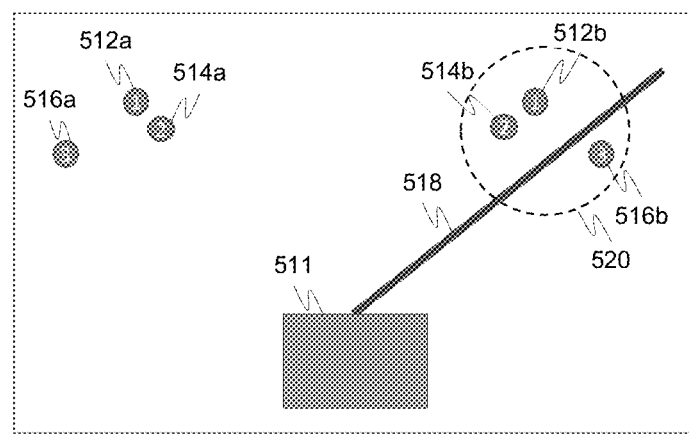
FIG. 5B is a diagram depicting an example illustration of the use of an example map matching module that uses camera data or path plan data to select the more likely true detection between multiple ambiguous radar candidate detections received from radar sensors, in accordance with various embodiments.

FIG. 5B provides an example illustration of the use of an example map matching module 306 without a detailed previously existing map, but instead with camera data or path plan data to select the more likely true detection 303 between multiple ambiguous radar candidate detections 301 received from radar sensors 511. Depicted are three sets of ambiguous candidate detections, candidate detection set 1 which includes candidate detections 512a and 512b, candidate detection set 2 which includes candidate detections 514a and 514b, and candidate detection set 3 which includes candidate detections 516a and 516b. The example map matching module 306 is configured to determine the position of the ambiguous candidate detections relative to a detected road region 518 detected from camera data. The example map matching module 306 is configured to determine the candidate detection in each set of candidate detections that is closest to the detected road region 518. If the candidate detection that is closest to the detected road region 518 (e.g., candidate detections 512b, 514b, 516b) is also within a threshold distance from the detected road region 518, the example map matching module 306 is configured to identify that candidate detection (e.g., candidate detections 512b, 514b, 516b) as a likely true detection 303. By determining the likely true detection 303, the vehicle can identify a true target location 520.

Referring again to FIG. 3, the example Bayesian map based road speed dynamics modelling module 308 is configured to select the more likely true detection 303 between multiple ambiguous radar candidate detections 301 by determining if the position and velocity (speed and direction) of travel indicated by candidate detections for a target are consistent with traveling on a road or lane depicted on a map. The selection module 318 may choose the Bayesian map based road speed dynamics modelling module 308 to select the more likely true detection 303 if a map of the area in the vicinity of the vehicle is available. The Bayesian map based road speed dynamics modelling module 308 is configured to calculate the apparent static range rate of a target, calculate road speed assuming it is traveling on the road, and filter out inconsistencies over time.

FIGS. 6A and 6B provide an example illustration of the use of an example Bayesian map based road speed dynamics modelling module 308 to select the more likely true detection 303 between multiple ambiguous radar candidate detections 301. Depicted in FIGS. 6A and 6B are roads 602, 612, respectively. A first target 604 from a first candidate detection and a second target 614 from a second candidate detection, are also respectively depicted in FIGS. 6A and 6B. The example Bayesian map based road speed dynamics modelling module 308 is configured, at discrete instances in time, to (a) calculate the apparent static range rate (srr) 606, 616 of each target 604, 614; (b) calculate the road speed 608, 618 of each target 604, 614, assuming the target is traveling on the road 602, 612; and (c) filter out (e.g., reject) candidate detections that are inconsistent with a target 604, 614 travelling on the road 602, 612. In this example of FIG. 6A, the target 604, at this time instance, is not positioned on the road and its associated candidate detection is filtered out. In the example of FIG. 6B, the target 614, at this time instance, is positioned in a lane 620 on the road 602, its direction of travel is consistent with the direction of travel for the lane 620, and its speed is consistent with the speed limit for the lane 620. Consequently, the candidate detection associated with target 614, at this instance in time, is not filtered out.

Referring back to FIG. 3, the example cross-sensor association module 310 is configured to select the more likely true detection 303 between multiple ambiguous radar candidate detections 301 by utilizing one or more additional sensors (e.g., an imaging device such as a camera for long-range radar or another radar of the same type) with an overlapped field of view to confirm the accuracy of a candidate detection. The cross-sensor association module 310 is configured to select the candidate detection that provides a target position that is closest to a detection from an additional sensor and that is less than some maximum threshold distance away from the target position indicated by the additional sensor. The selection module 318 may choose the cross-sensor association module 310 to select the more likely true detection 303 if data from another sensor is available.

Figure 7:
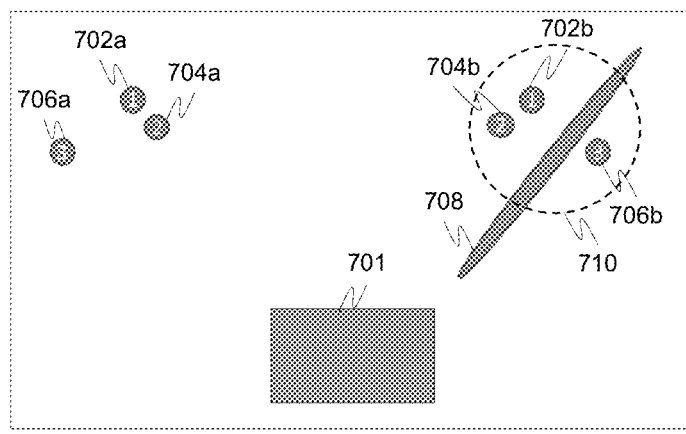
FIG. 7 is a diagram depicting an example illustration of the use of an example cross-sensor association module to select the more likely true detection between multiple ambiguous radar candidate detections received from radar sensors, in accordance with various embodiments.

FIG. 7 provides an example illustration of the use of an example cross-sensor association module 310 to select the more likely true detection 303 between multiple ambiguous radar candidate detections 301 received from radar sensors 701. Depicted are three sets of ambiguous candidate detections, candidate detection set 1 which includes candidate detections 702a and 702b, candidate detection set 2 which includes candidate detections 704a and 704b, and candidate detection set 3 which includes candidate detections 706a and 706b. The example cross-sensor association module 310 is configured to access an additional detection 708, and identify the candidate detection in each set of candidate detections that is closest to the additional detection 708. If the candidate detection that is closest to the additional detection 708 (e.g., candidate detections 702b, 704b, 706b) is also within a threshold distance from the additional detection 708, the example cross-sensor association module 310 is configured to identify that candidate detection (e.g., candidate detections 702b, 704b, 706b) as a likely true detection 303. By determining the likely true detection 303, the vehicle can identify a true target location 710.

Referring again to FIG. 3, the example first bi-modal measurement module 312 is configured to select the more likely true detection 303 between multiple ambiguous radar candidate detections 301 by comparing candidate detection data with data from an image sensor. The first bi-modal measurement module is configured to determine the probability of a candidate detection being the true detection by computing a gaussian model, e.g., $\Sigma_{i=1}^{2}\lambda_i N(\mu_i, \Sigma_i)$, which includes a gaussian distribution for each radar candidate detection and a component for the image data, wherein $\lambda_i$ relates to vision attributes and $\mu_i, \Sigma_i$ relate to radar attributes. The first bi-modal measurement module 312 is configured to select the candidate detection that has the highest probability of being the true detection. The selection module 318 may choose the first bi-modal measurement module 312 to select the more likely true detection 303 if data from an imaging sensor is available.

Figure 8A:
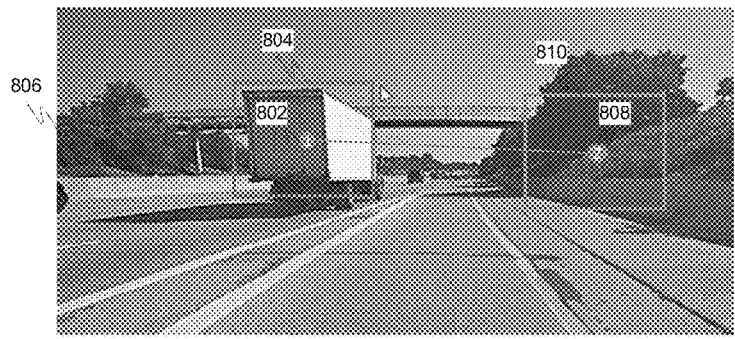
FIG. 8A is a prospective diagram depicting an example illustration of the use of an example first bi-modal measurement module using image data to select the more likely true detection between multiple ambiguous radar candidate detections, in accordance with various embodiments.
Figure 8B:
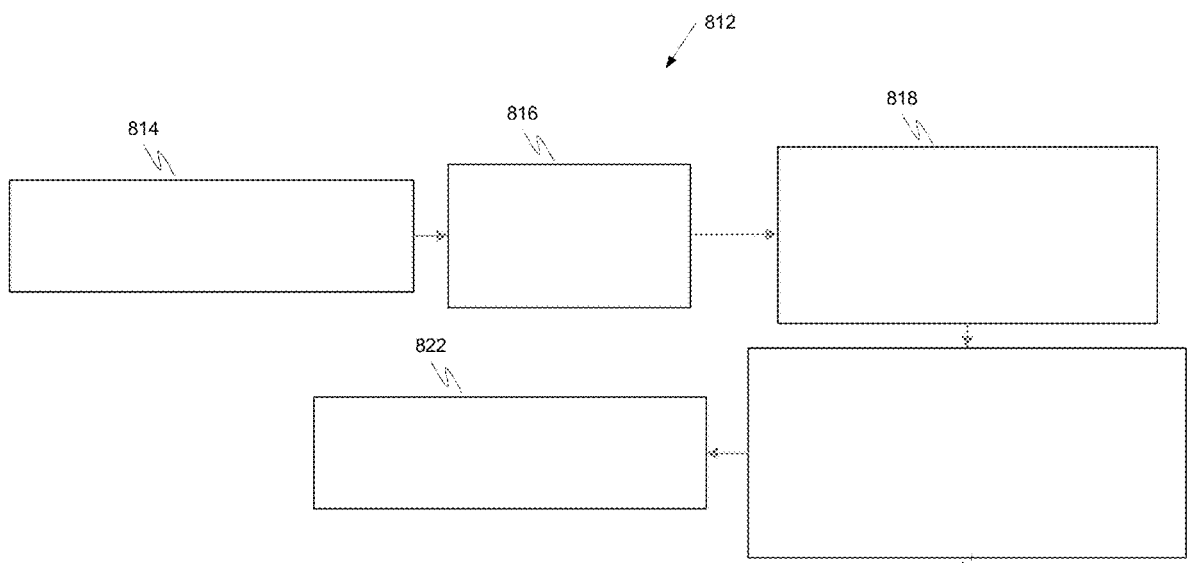
FIG. 8B is a process flow chart depicting an example process in an example first bi-modal measurement module for selecting the more likely true detection, in accordance with various embodiments.

FIGS. 8A and 8B provide an example illustration of the use of an example first bi-modal measurement module 312 using image data to select the more likely true detection 303 between multiple ambiguous radar candidate detections 301. FIG. 8A is a prospective diagram illustrating an example first candidate detection 802, which a region of interest (ROI) 804 in an image 806 discloses as being a truck, having a 99% probability of being the true detection and an example second candidate detection 808, which a ROI 810 in the image 806 discloses as being a grassy area above a guard wall, having a 1% probability of being the true detection.

FIG. 8B is a process flow chart depicting an example process 812 in an example first bi-modal measurement module 312 for selecting the more likely true detection 303. The example process 812 includes extracting, for each radar return, a region of interest (ROI) localized around the radar returns from image data from cameras (operation 814). Next, the example process 812 includes computing a vision feature vector for each ROI (e.g., feature vector extraction) (operation 816). Then, the example process 812 includes estimating the likelihood that each of the paired candidates are real, $\lambda_i$ (i=1, 2), from the vision feature vector via a logistic classifier (e.g., classification) (operation 818). Next, the example process 812 includes deriving the target's measurement pdf (probability density function) (bi-modal): $\Sigma_{i=1}^{2}\lambda_i N(\mu_i, \Sigma_i)$, where N is a normal gaussian distribution, $\mu_i$ are the radar return measurements (range, range rate, azimuth), and $\Sigma_i$ are the covariance matrix (operation 820). Finally, the example process 812 includes associating and updating the MHT (multiple hypothesis tracker) population based on the measurement pdf (operation 822). In this specific example, operation 816 may be performed by a generic feature vector extractor module and operation 818 may be performed by a logistic feature classifier. In other embodiments, operation 816 (e.g., feature extraction) and operation 818 (e.g., classification) may be performed by some other type of trained detector in the image space that provides a probabilistic output, $\lambda_i$ (i=1, 2), such as a neural network or a SVM (support vector machine).

Referring back to FIG. 3, the example a second bi-modal measurement module 314 is configured to select the more likely true detection 303 between multiple ambiguous radar candidate detections 301 by using radar features. The example second bi-modal measurement module 314 does not require data from a second sensor, but instead uses radar signature data to select the more likely true detection 303. The second bi-modal measurement module 314 is configured to determine the probability of a candidate detection being the true detection by computing a gaussian model, $\Sigma_{i=1}^{2}\lambda_i N(\mu_i, \Sigma_i)$, which has a gaussian distribution for each radar candidate detection, wherein A relates to radar signature data and $\mu_i, \Sigma_i$ relate to radar position attributes. The second bi-modal measurement module 314 is configured to select the candidate detection that has the highest probability of being the true detection.

Figure 9A:
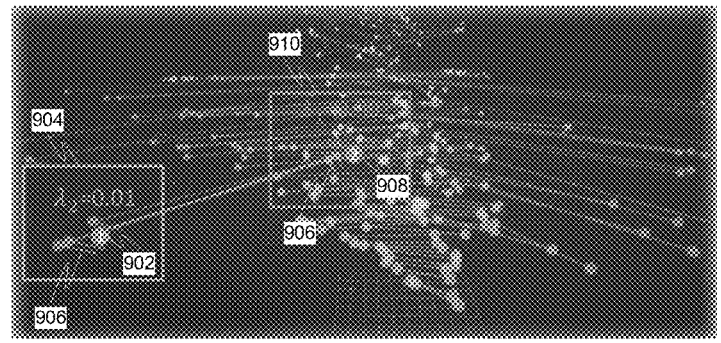
FIG. 9A is a prospective diagram depicting an example illustration of the use of an example second bi-modal measurement module using radar detection characteristics to select the more likely true detection between multiple ambiguous radar candidate detections, in accordance with various embodiments.
Figure 9B:
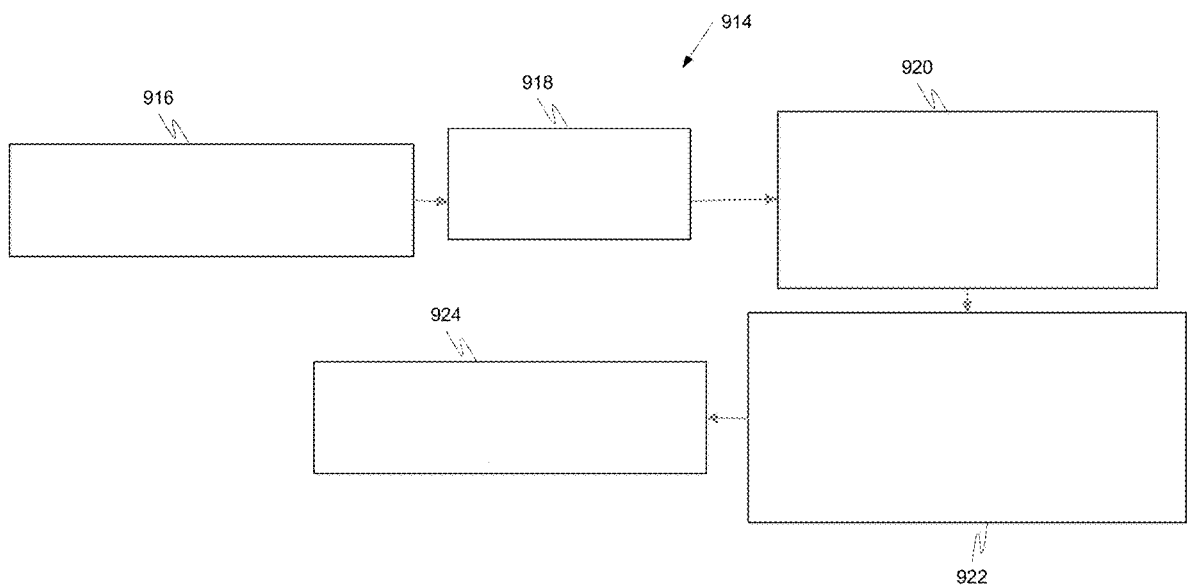
FIG. 9B is a process flow chart depicting an example process in an example second bi-modal measurement module for selecting the more likely true detection, in accordance with various embodiments.

FIGS. 9A and 9B provide an example illustration of the use of an example second bi-modal measurement module 314 using radar detection characteristics to select the more likely true detection 303 between multiple ambiguous radar candidate detections 301. FIG. 9A is a prospective diagram illustrating an example first candidate detection 902, with a ROI 904 having radar signature data 906, having a 1% probability of being the true detection and an example second candidate detection 908, with a ROI 910 having radar signature data 912, having a 99% probability of being the true detection.

FIG. 9B is a process flow chart depicting an example process 914 in an example second bi-modal measurement module 314 for selecting the more likely true detection 303. The example process 914 includes extracting radar detections from regions of interest (ROI) around the radar returns (operation 916). Next, the example process 914 includes computing a radar feature vector for both ROI sets (e.g., feature vector extraction) from radar signature data (operation 918). Then, the example process 914 includes estimating the likelihood that each of the paired candidates are real, $\lambda_i$ (i=1, 2), from the radar feature vector via a probabilistic output classifier (e.g., classification) (operation 920). Next, the example process 914 includes deriving the target's measurement pdf (probability density function) (bi-modal): $\Sigma_{i=1}^{2}\lambda_i N(\mu_i, \Sigma_i)$, where N is a normal gaussian distribution, $\mu_i$ are the radar return measurements (range, range rate, azimuth), and $\Sigma_i$ are the covariance matrix (operation 922). Finally, the example process 914 includes associating and updating the MHT (multiple hypothesis tracker) population based on the measurement pdf (operation 924). In this specific example, operation 918 may be performed by a generic feature vector extractor module and operation 920 may be performed by a probabilistic output classifier. In various embodiments, operation 918 (e.g., feature extraction) and operation 920 (e.g., classification) may be performed by different types of trained detectors in the radar feature space that are configured to distinguish vehicles from non-vehicles and provide a probabilistic output, $\lambda_i$ (i=1, 2), such as a neural network or a SVM.

Referring back to FIG. 3, the example reinforcement learning discriminator module 316 is configured to select the more likely true detection 303 between multiple ambiguous radar candidate detections 301 using a trained machine learning (ML) model. The example reinforcement learning discriminator module 316 includes a trained ML model that was trained to predict future traversable paths through traffic using ambiguous radar candidate detections. The example reinforcement learning discriminator module 316 is configured to apply real-time ambiguous radar candidate detections to the trained ML model to predict drivable paths, determine which of the ambiguous radar candidate detections contribute to the drivable paths, and select candidate radar candidate detections that contribute to the drivable paths as the more likely true detection 303.

Figure 10A:
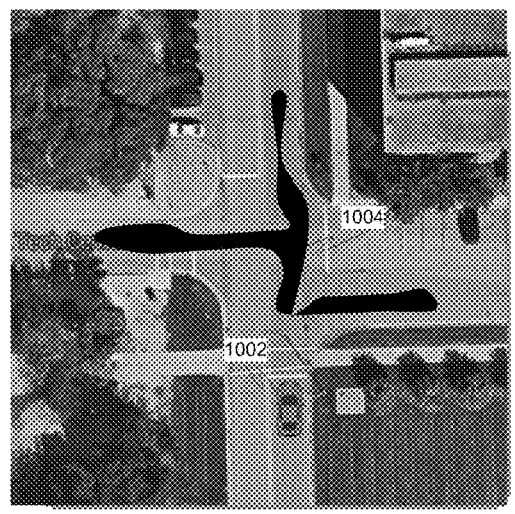
FIG. 10A is a diagram depicting an example operating scenario in which an example vehicle that is equipped with a reinforcement learning discriminator module that includes a ML (machine learning) model that has been trained to predict drivable paths based on ambiguous radar candidate detections, in accordance with various embodiments.
Figure 10B:
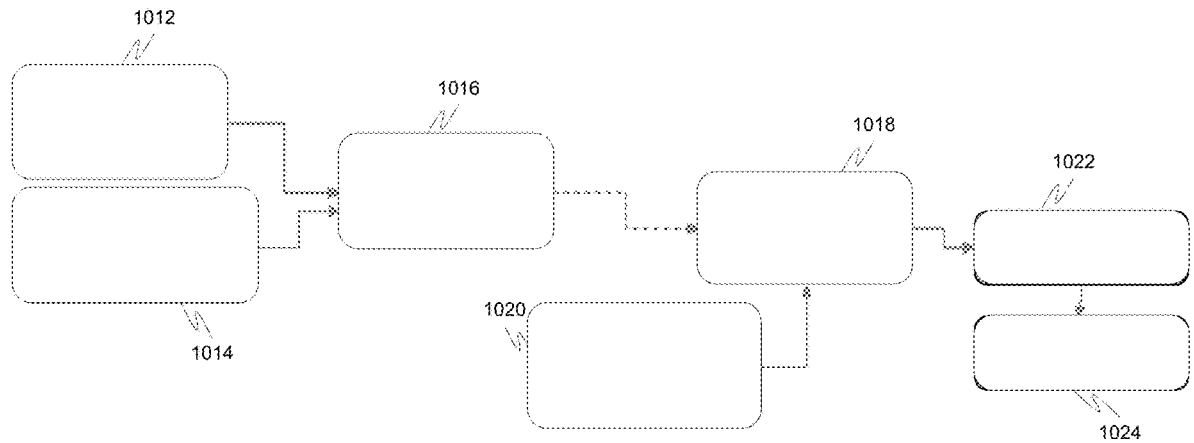
FIG. 10B is a process flow chart depicting an example process in which a ML model is trained and used when predicting a likely true radar detection, in accordance with various embodiments.

FIGS. 10A and 10B provide an example illustration of the use of an example reinforcement learning discriminator module 316 to select the more likely true detection 303 between multiple ambiguous radar candidate detections 301. FIG. 10A depicts an example operating scenario in which an example vehicle 1002 that is equipped with a reinforcement learning discriminator module 316 that includes a ML model that has been trained to predict drivable paths 1004 based on ambiguous radar candidate detections.

FIG. 10B is a process flow chart depict an example process 1010 in which a ML model is trained and used when predicting a likely true radar detection. A labeled data set of historical ambiguous radar data and drivable paths that can be generated from data concerning prior paths driven by the vehicle. Historical ambiguous sensor data 1012 and ten second snippets of path driven data 1014 can be used to train (operation 1016), using reinforced learning techniques, the ML model 1018 to predict drivable paths based on ambiguous radar candidate detections. After the ML model 1018 is trained to predict drivable paths based on ambiguous radar candidate detections, real-time ambiguous sensor data 1020 can be applied to the ML model 1018. The ML model 1018 can predict drivable paths (operation 1022). Based on the predicted drivable paths, the example reinforcement learning discriminator module 316 can determine which of the ambiguous radar candidate detections contributed to the drivable paths and select the candidate radar candidate detections that contributed to the drivable paths as the more likely true detection (operation 1024).

Figure 11:
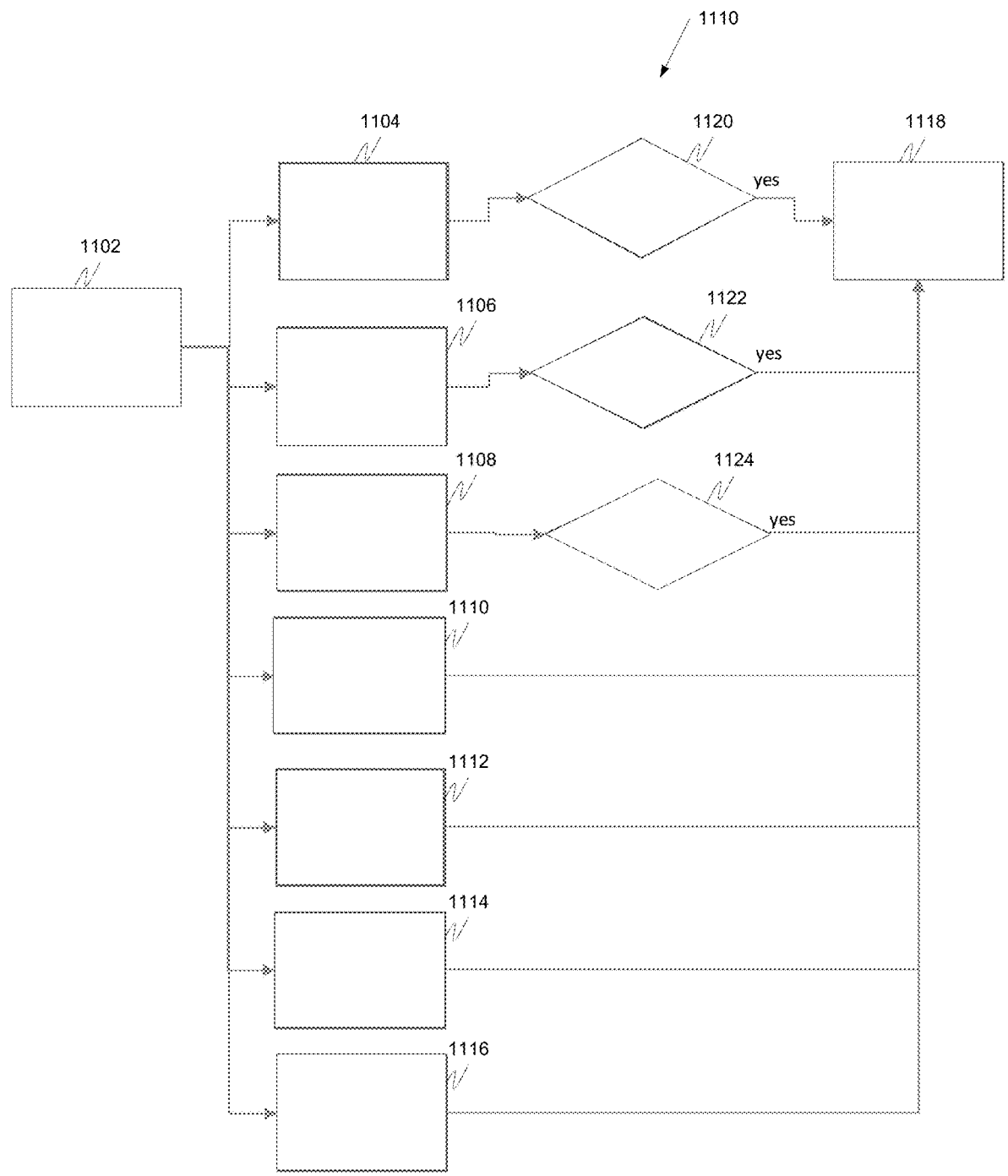
FIG. 11 is a process flow chart depicting an example process for selecting the more likely true detection between multiple ambiguous radar candidate detections, in accordance with various embodiments.

FIG. 11 is a process flow chart depicting an example process 1100 for selecting the more likely true detection between multiple ambiguous radar candidate detections. The order of operation within process 1100 is not limited to the sequential execution as illustrated in the figure, but may be performed in one or more varying orders as applicable and in accordance with the present disclosure.

The example process 1100 includes selecting an approach to try (operation 1102). The selection decision may be made based on other available sensor data or measurements. The selection decision may be to try one approach and if that approach is not successful then to try another approach. The selected approach may involve finding the distance to the nearest predicted track (operation 1104), for example using a track gating module 304. The selected approach may involve finding the distance to the nearest valid target path (operation 1106), for example using a map matching module 306. The selected approach may involve finding the distance to the nearest unambiguous detection (operation 1108), for example using a cross-sensor association module 310. The selected approach may involve finding the likelihood of each target using image features (operation 1110), for example using a first bi-modal measurement module 312. The selected approach may involve finding the likelihood of each target using radar features (operation 1112), for example using a second bi-modal measurement module 314. The selected approach may involve finding the likelihood of each target given wholistic path predictions (operation 1114), for example using a reinforcement learning discriminator module 316. The selected approach may involve finding the likelihood of each target using speed and direction of travel (operation 1116), for example using a Bayesian Map Based Road Speed Dynamics modelling module 308.

When the selected approach involves finding the distance to the nearest predicted track (operation 1104), a selected candidate is associated with the true detection (operation 1118), when the selected candidate has a distance that is nearest to the predicted track position and below a threshold distance (operation 1120). When the selected approach involves finding the distance to the nearest valid target path (operation 1106), a selected candidate is associated with the true detection (operation 1118), when the selected candidate has a distance that is nearest to a valid target path and below a threshold distance (operation 1122). When the selected approach involves finding the distance to the nearest unambiguous detection (operation 1108), a selected candidate is associated with the true detection (operation 1118), when the selected candidate has a distance that is nearest to an unambiguous detection and below a threshold distance (operation 1124). When the selected approach involves finding a likelihood of each target (operations 1110, 1112, 1114, 1116), the candidate with the highest likelihood is associated with the true detection (operation 1118).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

As an example, the apparatus, systems, methods, techniques and articles described herein may be applied to measurement systems other than radar systems. The apparatus, systems, methods, techniques and articles described herein may be applied to velocity measurement sensors such as laser or light-based velocity measurement sensors.

What is claimed is:

1. A disambiguating system for disambiguating between ambiguous detections from a first sensor, the system comprising a plurality of modules, each module configured to disambiguate between the ambiguous detections by selecting, as a true detection, one candidate detection in a set of the ambiguous detections, each module configured to apply a different selection technique, the system comprising:
   one or more modules configured, by a processor, to select, as the true detection, the candidate detection whose associated position is closer to a predicted next position for a target, closer to a first known travel pathway, consistent with a target traveling on a second known travel pathway, and/or closer to a position indicated by a detection from another sensor; and
   one or more modules configured, by a processor, to select, as the true detection, the candidate detection with the highest probability of being true based on sensor data from a sensor other than the first sensor.

2. The system of claim 1, wherein the ambiguous detections comprise ambiguous radar detections, the set of the ambiguous detections comprise two ambiguous radar detections, and the selecting, as a true detection, one candidate detection in a set of the ambiguous detections comprises selecting, as a true detection, one candidate radar detection in a set of two ambiguous radar detections.

3. The system of claim 1, wherein the one or more modules configured to select, as the true detection, the candidate detection whose associated position is closer to a predicted next position for a target, closer to a first known travel pathway, consistent with a target traveling on a second known travel pathway, and/or closer to a position indicated by a detection from another sensor comprises one or more of:
- a first module configured to select, as a true detection, the candidate detection that is closest to a predicted next position for a target;
- a second module configured to select, as a true detection, the candidate detection that is closest to a first known travel pathway;
- a third module configured to select, as a true detection, the candidate detection that indicates a position and velocity that are consistent with a target traveling on a second known travel pathway; and
- a fourth module configured to select, as a true detection, the candidate detection that indicates a position that is closest to a position indicated by a detection from another sensor.

4. The system of claim 3, wherein the first module is configured to compute a distance metric from the last position of a tracked target to each candidate detection, predict a next position for the tracked target, and select a candidate detection whose distance from the predicted next position is less than a threshold distance.

5. The system of claim 3, wherein the first known travel pathway is determined from map data and wherein the second module is configured to select the candidate detection that is closest to the first known travel pathway and within a threshold distance from the first known travel pathway.

6. The system of claim 3, wherein the first known travel pathway is determined by imaging data and wherein the second module is configured to select the candidate detection that is closest to the first known travel pathway and within a threshold distance from the travel pathway.

7. The system of claim 3, wherein the third module is configured to calculate an apparent static range rate of a target based on a candidate detection, calculate road velocity, and filter out candidate detections that indicate a target with a position and calculated velocity that are inconsistent with traveling on the second known travel pathway.

8. The system of claim 3, wherein the fourth module is configured to compare the candidate detection with data from a second sensor that has an overlapped field of view.

9. The system of claim 8, wherein the second sensor comprises an imaging device.

10. The system of claim 8, wherein the second sensor comprises a radar sensor.

11. The system of claim 1, wherein the one or more modules configured to select, as the true detection, the candidate detection with the highest probability of being true based on sensor data from the sensor other than the first sensor comprises one or more of:
- a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real; and
- a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real.

12. The system of claim 1, further comprising:
- a seventh module comprising a model trained using machine learning techniques to select the candidate detection that indicates a position that is consistent with a learned drivable path.

13. The system of claim 12, wherein the model was trained using reinforcement learning techniques using a data set of past ambiguous radar data and time-limited snippets of drivable paths and wherein the seventh module is configured to select the candidate detection that likely contributed to one of the drivable paths.

14. A vehicle, comprising a radar detection sensing device, a second sensing device, and a disambiguating system for disambiguating between ambiguous radar detections, the system comprising a plurality of modules, each module configured to disambiguate between the ambiguous radar detections by selecting, as a true detection, one candidate radar detection in a set of the ambiguous radar detections, each module configured to apply a different selection technique, the system comprising:
- one or more modules configured to select, as the true detection, the candidate radar detection whose associated position is closer to a predicted next position for a target, closer to a first known travel pathway, consistent with a target traveling on a second known travel pathway, and/or closer to a position indicated by a detection from the second sensing device; and
- one or more modules configured to select, as the true detection, the candidate detection with the highest probability of being true based on sensor data from the second sensing device.

15. The vehicle of claim 14, wherein the one or more modules configured to select, as the true detection, the candidate detection whose associated position is closer to a predicted next position for a target, closer to a first known travel pathway, consistent with a target traveling on a second known travel pathway, and/or closer to a position indicated by a detection from the second sensing device comprises one or more of:
- a first module configured to select, as a true detection, the candidate detection that is closest to a predicted next position for a target;
- a second module configured to select, as a true detection, the candidate detection that is closest to a first known travel pathway;
- a third module configured to select, as a true detection, the candidate detection that indicates a position and velocity that are consistent with a target traveling on a second known travel pathway; and
- a fourth module configured to select, as a true detection, the candidate detection that indicates a position that is closest to a position indicated by a detection from another sensor.

16. The vehicle of claim 15, wherein:
- the first module is configured to compute a distance metric from the last position of a tracked target to each candidate detection, predict a next position for the tracked target, and select a candidate detection whose distance from the predicted next position is less than a threshold distance;
- the first known travel pathway is determined from map data or imaging data and wherein the second module is configured to select the candidate detection that is closest to the first known travel pathway and within a threshold distance from the first known travel pathway;
- the third module is configured to calculate an apparent static range rate of a target based on a candidate detection, calculate road velocity, and filter out candidate detections that indicate a target with a position and calculated velocity that are inconsistent with traveling on the second known travel pathway;

the fourth module is configured to compare the candidate detection with data from a second sensor that has an overlapped field of view; and the second sensor comprises an imaging device or a radar sensor.

17. The vehicle of claim 14, wherein the one or more modules configured to select, as the true detection, the candidate detection with the highest probability of being true based on sensor data from the second sensing device comprises one or more of:

a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real; and a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real.

18. The vehicle of claim 14, further comprising:

a seventh module comprising a model trained using machine learning techniques to select the candidate detection that indicates a position that is consistent with a learned drivable path.

19. The vehicle of claim 18, wherein the model was trained using reinforcement learning techniques using a data set of past ambiguous radar data and time-limited snippets of drivable paths and wherein the seventh module is configured to select the candidate detection that likely contributed to one of the drivable paths.

20. A disambiguating system for disambiguating between ambiguous detections, the system comprising:

a first module configured to select, as a true detection, a candidate detection that is closest to a predicted next position for a target, wherein the first module is configured to compute a distance metric from the last position of a tracked target to each candidate detection, predict a next position for the tracked target, and select a candidate detection whose distance from the predicted next position is less than a threshold distance;

a second module configured to select, as a true detection, a candidate detection that is closest to a first known travel pathway, wherein the first known travel pathway is determined from map data or imaging data and the second module is configured to select the candidate detection that is closest to the first known travel pathway and within a threshold distance from the first known travel pathway;

a third module configured to select, as a true detection, a candidate detection that indicates a position and velocity that are consistent with a target traveling on a second known travel pathway, wherein the third module is configured to calculate an apparent static range rate of a target based on a candidate detection, calculate road velocity, and filter out candidate detections that indicate a target with a position and calculated velocity that are inconsistent with traveling on the second known travel pathway;

a fourth module configured to select, as a true detection, a candidate detection that indicates a position that is closest to a position indicated by a detection from another sensor, wherein the fourth module is configured to compare the candidate detection with data from a second sensor that has an overlapped field of view and the second sensor comprises an imaging device or a radar sensor;

a fifth module configured to compute a gaussian distribution for each candidate detection and image data having a field of view that encompasses the candidate detection, estimate the likelihood that the candidate detection is real based on the computed gaussian distribution, and select the candidate detection that has the highest probability of being real;

a sixth module configured to compute a gaussian distribution for each candidate detection and radar feature data having a field of view that encompasses the candidate detection, estimate the likelihood that the candidate detection is real based on the computed gaussian distribution, and select the candidate detection that has the highest probability of being real; and a seventh module comprising a model trained using machine learning techniques to select a candidate detection that indicates a position that is consistent with a learned drivable path, wherein the model was trained using reinforcement learning techniques using a data set of past ambiguous radar data and time-limited snippets of drivable paths and wherein the seventh module is configured to select the candidate detection that likely contributed to one of the drivable paths.

* * * * *